United States Patent Office 3,079,412
Patented Feb. 26, 1963

3,079,412
CONTINUOUS MANUFACTURE OF
MONOGLYCERIDES
Stephen S. Chang, Decatur, and Lars H. Wiedermann, Des Plaines, Ill., assignors to Swift & Company, Chicago, Ill., a corporation of Illinois
No Drawing. Filed Aug. 15, 1960, Ser. No. 49,444
5 Claims. (Cl. 260—410.7)

The present invention relates to a process for the preparation of fatty acid partial esters of polyhydric alcohols. More particularly, the invention relates to a continuous, countercurrent process for preparing fatty acid monoglycerides from glycerine and fats or fatty oils.

In the past, monoesters of polyhydric alcohols have been prepared by batch processes in which polyesters of polyhydric alcohols are reacted with a polyhydric alcohol in the presence of a suitable alcoholysis catalyst at elevated temperatures and for extended periods of time. More recently, continuous and/or countercurrent processes which give varying results in the yield and quality of the resultant monoester have been suggested. These latter processes are generally subject to well-defined and critical operating conditions. For example, the short reaction time in a continuous process, when compared to that of the batch method, makes necessary an intimate contact of the reactants, but such an intimate contact is difficult to achieve, and various proposals of vigorous agitation during the reaction have been proposed with varying degree of success. Furthermore, it is generally considered necessary to immediately and rapidly cool the reaction mixture prior to destruction of the catalyst. However, the mixture, when cooled prior to catalyst removal, undergoes an equilibrium shift in the direction of lower monoester yields.

It is therefore an object of the present invention to provide an improved continuous countercurrent method for producing fatty acid esters of polyhydric alcohols.

It is another object of this invention to provide a countercurrent process for the production of monoesters which effectively achieves intimate contact of the reactants.

It is a further object of this invention to provide a method for removal of catalyst from the reaction product which obviates rapid cooling.

It is a still further object of this invention to provide a method for producing monoesters in consistently high yields.

Further objects and advantages, if not specifically set forth, will become apparent to one skilled in the art during the course of the following description.

Broadly, this invention relates to a method for producing monoesters by countercurrently contacting a homogenized mixture of a triglyceride, polyhydric alcohol and catalyst, with a polyhydric alcohol solution of additional catalyst. The reaction takes place preferably in a packed column and the catalyst is then promptly removed without disturbing the equilibrium of the product. Any inert packing material for fractional distillation work can be used, for example, glass, stainless steel, and ceramics in various sizes and shapes to give the desired surface areas and column hold-up.

More specifically, and with particular reference to the production of monoglycerides from fats and oils, the reaction between the homogenized mixture and the alcohol solution is accomplished in a reaction column packed preferably with glass helices and heated to from about 220° C. to about 250° C. A solution of an alcoholysis catalyst and glycerol is dropped into the column through a tube which extends a few inches below the top of the heated packing of helices. The mixture of triglycerides, glycerol and catalyst in proper ratios is homogenized under pressure, preheated, and fed into the column in small drop-lets from a tube having a capillary tip extending several inches above the bottom of the column but below the packing of helices. After the column becomes filled, the product is overflowed from the column through a tube connected to the column near the top thereof and above the packing. This product is dropped directly into a bed of an acid cation exchange resin which removes the catalyst from the reaction product. Excess glycerine, which may be recycled, is removed from the column through an outlet near the bottom thereof and below the tube admitting the homogenized mixture.

We have found that the preparation of monoglycerides under the above operating conditions results in yields superior to those available in batch processes and in ordinary continuous processes using the same ratios of ingredients and catalyst.

The triglycerides which may be treated by the process of this invention may be any triglyceride of vegetable, animal or marine origin or mixtures thereof. The fats may be hydrogenated or unhydrogenated. Suitable fats are cottonseed oil, soybean oil, fish oil, lard and tallow.

While the reaction temperature may be rather within the range of from about 200° C. to about 350° C., depending upon the individual reactants selected and the character of the ester desired, we have found that when preparing monoglycerides, a range of from about 220° C. and about 250° C. is desirable. Temperatures above 250° C. may cause considerable polymerization of some polyhydric alcohols, such as glycerines.

The ester-forming reaction may be conducted in the presence of an alkaline alcoholysis catalyst such as an alkali metal hydroxide. Generally, sodium hydroxide has been found to be satisfactory and may be employed in well-known or preferred amounts. Generally about 0.05% to 2.0% by weight of the fatty material is sufficient. The catalyst may be separately incorporated into one or both of the reactants.

An important feature of the invention in achieving improved yields of mono-ester with decreased reaction time is the intimate contact of the reactants. The miscibility of glycerol and triglycerides at the monoester formation temperatures is at best very poor. We have discovered that a relatively simple, yet highly effective procedure for enhancing this miscibility and ensuring intimate contact is to homogenize the mixture of triglyceride, polyhydric alcohol and catalyst. The homogenization may be achieved by well-known means, for example, as by forcing the product through an orifice under pressure or other suitable mechanical means. While the homogenization pressure is not critical, we have found a pressure of about 250 lb. per sq. in. to be operatively satisfactory. The mixture is homogenized just prior to charging to the reaction zone, and may also be simultaneously preheated.

The amount of glycerine in the homogenized mixture is limited by the solubility of glycerine in the fat at the reaction temperatures. At about 225–250° C. approximately 30–40% of glycerine by weight can be incorporated in the fat.

The reaction is accomplished through the countercurrent contact of the solution and homogenized mixture in a packed reaction vessel. The combination of the countercurrent contact and tortuous path necessitated by the packing assures and continues the high miscibility and intimate contact made possible by the homogenization step. The vessel is preferably equipped with a heating jacket such that desired temperatures may be maintained therein.

The rates of flow of reactants is variable within reasonable limits. The glycerol solution must flow at the proper rate to have the desired molar quantities of reactants entering the countercurrent vessel. Increased yields of mono-ester are obtained when the glycerol solution is added at a higher rate than the homogenized mixture. It is desirable to maintain a considerable excess of glycerine, such as about 1.5 to 2.5 parts by weight to each part of fatty material. The economics of the system is unaffected since the resultant glycerol overflow is re-cycled. Because of the inherent superior mixing of the reactants, the present system is much less susceptible to changes in flow rate and can therefore operate at a faster rate than ordinary continuous reactions. We have found that periods of residence of the reactants in the column of 2 to 3 minutes can be used. An hour or more may be required in some equipment.

Another highly important factor governing the efficiency of a mono-ester producing reaction is the immediate inactivation and/or removal of the catalyst upon completion of the reaction. Heretofore, it has been customary to first cool the reaction product and then neutralize the catalyst. This process has the inherent disadvantage of lowering the percentage of mono-ester in the final product since cooling before the catalyst is removed causes an equilibrium shift in the direction of lower amounts of mono-ester in the mixture. It has been found that by promptly treating the reaction product taken directly from the reaction vessel (without having it undergo appreciable cooling) with an acid cation exchange resin, the reaction-temperature equilibrium-quantity of mono-ester is maintained.

The cation exchange resins derive their activity from acid groups and may be selected from carboxylic acid and sulfonic acid type resins. Any suitable acid cation exchange resin may be used. For example, resins containing polymers of certain carboxylic acids, preferably aromatic acids, such as phthalic acid or phthalic anhydride and polyvinyl benzene may be employed. Permutite Q, produced by Pfandler Permutite Inc. 1000 West Avenue, Rochester, New York, and IRC–50 made by Rohm & Haas, Washington Square, Philadelphia, Pennsylvania, are believed to be the latter type resins. Also sulfonated resins such as copolymers of styrene with divinyl benzene and containing varying amounts of divinyl benzene are useful. Amberlite IR–120 acid Dowex 50, products of the Rohm & Haas Company, and Dow Chemical Company, Midland, Michigan, respectively, are also suitable for use. It may be desirable to treat the resins before use with a mineral acid such as sulfuric or hydrochloric to assure it is in the acid form. The use of these resins for catalyst removal results in an essentially acid free glycerol with the absence of salts in the neutralized product. Thus, glycerol separated from this product is ready for immediate re-use in the continuous process.

*Example*

A reaction column (36 in. in length and ¾ in. in diameter, packed with glass helices 1/16 in. in diameter) is heated to 250° C. Glycerol, which contains 0.2% sodium hydroxide, is added from the top of the column at a rate of 3 g. per minute and a homogenized mixture of 100 g. cottonseed oil, 45 g. glycerol and 0.1 g. NaOH is pumped into the column from the bottom at a rate of 2 g. per minute. As soon as the column is completely filled with oil and glycerol, an outlet near the bottom of the column is opened to such an extent that glycerol is removed from the column at the same rate as it is added from the top. The product overflowing from the top of the column is immediately passed through a 3 in. bed of an acid cation exchange resin (Permutite Q). The bed of resin is kept at a temperature of below 60° C. The final product contains about 70% of monoglycerides.

Obviously, many modifications and variations of the invention, as hereinbefore set forth, may be made without departing from the spirit and scope thereof and therefore only such limitations should be imposed as are indicated in the appended claims.

We claim:
1. A continuous process for the preparation of monoglycerides which comprises: continuously passing a homogenized mixture of a glyceride and a first portion of glycerol into a reaction zone maintained at a temperature of from about 200° to about 350° C.; simultaneously and counter-currently passing a second portion of said glycerol into said reaction zone in the presence of an alkaline alcoholysis catalyst; continuously withdrawing the reaction mixture from said reaction zone; and immediately inactivating said catalyst prior to any appreciable cooling of said reaction mixture, thereby halting the reaction at the reaction-temperature equilibrium-content of mono-esters.

2. The process of claim 1 wherein the reaction is halted by immediately treating the reaction product with an acid cation exchange resin.

3. A continuous process for the preparation of monoglycerides which comprises: continuously passing a homogenized mixture of a glyceride and a portion of glycerol in the presence of a relatively small amount of an alkaline alcoholysis catalyst into a reaction zone maintained at a temperature of from about 200° to about 350° C.; continuously and simultaneously passing a solution of another portion of said glycerol and a second relatively small amount of said alkaline alcoholysis catalyst into said reaction zone; maintaining intimate contact of the reactants in said reaction zone; continuously withdrawing the reaction mixture from said reaction zone; and immediately inactivating said catalyst by treating the reaction mixture with an acid cation exchange resin prior to any appreciable cooling of said reaction mixture.

4. A continuous process for the preparation of monoglycerides which comprises: homogenizing a mixture of a fat and glycerol in the presence of a catalytic amount of sodium hydroxide; continuously passing said homogenized mixture into one end of a reaction zone maintained at a temperature of between about 200° and about 350° C.; continuously and simultaneously passing a solution of glycerol and a second catalytic amount of sodium hydroxide into the other end of said reaction zone; maintaining intimate contact between said homogenized mixture and said solution; withdrawing the reaction mixture from said reaction zone; and immediately treating the reaction mixture with an acid cation exchange resin, to remove the catalyst from the product prior to any appreciable cooling of said reaction mixture.

5. A continuous process for the preparation of monoglycerides which comprises: passing a homogenized mixture of fat, glycerol and an alcoholysis catalyst into the lower portion of a reaction tower, charging glycerol into the upper portion of said tower intimately contacting the materials charged to said tower by countercurrent flow, maintaining the tower at a temperature sufficiently high to cause alcoholysis and formation of monoglycerides, withdrawing the reaction product containing catalyst and monoglycerides from the top of said tower, contacting promptly, said reaction product with a cation exchange resin to remove the used catalyst from the product before said product has appreciably cooled and recovering excess glycerine for recycling from the bottom of said tower.

References Cited in the file of this patent

UNITED STATES PATENTS

| 2,474,740 | Ittner | June 28, 1949 |
| 2,744,124 | Alsop | May 1, 1956 |
| 2,909,540 | Woods | Oct. 20, 1959 |

OTHER REFERENCES

Kunin: "Ion Exchange Resins," 2nd ed., copyright by John Wiley & Sons, Inc., pages 113 and 160.